United States Patent
Kato et al.

(10) Patent No.: US 11,953,351 B2
(45) Date of Patent: Apr. 9, 2024

(54) TACTILE AND PROXIMITY SENSOR

(71) Applicant: Murata Manufacturing Co., Ltd., Nagaokakyo (JP)

(72) Inventors: Takatoshi Kato, Nagaokakyo (JP); Hiroshi Watanabe, Nagaokakyo (JP); Kohei Sugahara, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 395 days.

(21) Appl. No.: 17/347,701

(22) Filed: Jun. 15, 2021

(65) Prior Publication Data
US 2021/0310835 A1 Oct. 7, 2021

Related U.S. Application Data

(63) Continuation of application No. PCT/JP2019/048239, filed on Dec. 10, 2019.

(30) Foreign Application Priority Data

Feb. 15, 2019 (JP) .................... 2019-025590

(51) Int. Cl.
*G01D 5/26* (2006.01)
*G01B 11/16* (2006.01)
*G01C 3/00* (2006.01)

(52) U.S. Cl.
CPC ............... *G01D 5/26* (2013.01); *G01B 11/16* (2013.01); *G01C 3/00* (2013.01)

(58) Field of Classification Search
None
See application file for complete search history.

(56) References Cited

U.S. PATENT DOCUMENTS

| | | | |
|---|---|---|---|
| 8,749,522 B2* | 6/2014 | Dietzel | G01L 1/247 73/800 |
| 9,510,786 B2* | 12/2016 | Gliner | A61B 5/6869 |
| 9,962,127 B2* | 5/2018 | Wang | A61B 5/349 |
| 2010/0108870 A1 | 5/2010 | Kramer et al. | |
| 2011/0067504 A1 | 3/2011 | Koyama et al. | |

(Continued)

FOREIGN PATENT DOCUMENTS

| | | |
|---|---|---|
| CN | 108323194 A | 7/2018 |
| CN | 109155628 A | 1/2019 |

(Continued)

OTHER PUBLICATIONS

Office Action in CN201980091957.2, dated Oct. 10, 2022, 7 pages.
Official Communication issued in International Patent Application No. PCT/JP2019/048239, dated Mar. 3, 2020.

*Primary Examiner* — Dominic J Bologna
*Assistant Examiner* — Roberto Fabian, Jr.
(74) *Attorney, Agent, or Firm* — Keating & Bennett, LLP

(57) ABSTRACT

A tactile and proximity sensor includes a light source, a light receiver, an elastic structure, and a reflecting mirror. The light source emits light. The light receiver receives light and generates a signal indicating a result of reception of the light. The elastic structure includes an elastic body deformable in response to an external force and includes a reflecting portion to reflect light and transmitting portions to transmit light. The reflecting mirror faces the light source to guide the light from the light source to the reflecting portion and the transmitting portion.

20 Claims, 8 Drawing Sheets

(56) References Cited

U.S. PATENT DOCUMENTS

| | | |
|---|---|---|
| 2012/0330190 A1 | 12/2012 | Gliner |
| 2013/0036829 A1 | 2/2013 | Van Steenberge et al. |
| 2014/0309550 A1 | 10/2014 | Iglesias |
| 2015/0177082 A1 | 6/2015 | Sawada et al. |
| 2016/0228071 A1 | 8/2016 | Wang et al. |
| 2017/0161540 A1* | 6/2017 | Mienko ............. H01L 31/02325 |
| 2017/0363464 A1* | 12/2017 | Shafer ....................... G01D 5/30 |
| 2019/0285735 A1 | 9/2019 | Hamaguchi |

FOREIGN PATENT DOCUMENTS

| | | |
|---|---|---|
| JP | 2007-071564 A | 3/2007 |
| JP | 5089774 B2 | 12/2012 |
| JP | 2013-007744 A | 1/2013 |
| JP | 2015-500057 A | 1/2015 |
| JP | 2016-512772 A | 5/2016 |
| WO | 2014/045685 A1 | 3/2014 |

* cited by examiner

TACTILE AND PROXIMITY SENSOR

CROSS REFERENCE TO RELATED APPLICATIONS

This application claims the benefit of priority to Japanese Patent Application No. 2019-025590 filed on Feb. 15, 2019 and is a Continuation Application of PCT Application No. PCT/JP2019/048239 filed on Dec. 10, 2019. The entire contents of each application are hereby incorporated herein by reference.

BACKGROUND OF THE INVENTION

1. Field of the Invention

The present invention relates to a tactile and proximity sensor.

2. Description of the Related Art

In recent years, various sensors are proposed which are mounted on robot hands or the like and capable of performing various types of sensing including tactile sensing (for example, Japanese Patent No. 5089774, Japanese Patent No. 5825604 and International Publication No. 2014/045685).

Japanese Patent No. 5089774 discloses a composite sensor to be attached to a fingertip surface of a robot hand for performing gripping operation on an object or the like. The composite sensor of Japanese Patent No. 5089774 has a tactile sensor provided with a pressure-sensitive sheet and a proximity sensor constituted of a reflective photosensor. The composite sensor of Japanese Patent No. 5089774 is configured by combining two sensors such that a detection surface of the proximity sensor is defined by the pressure-sensitive sheet.

Japanese Patent No. 5825604 discloses an optical tactile sensor capable of measuring six-axis force. International Publication No. 2014/045685 discloses a force sensor that detects a shearing force using a variable frame. In Japanese Patent No. 5825604 and International Publication No. 2014/045685, in an optical mechanism utilizing deformation of an elastic body, tactile sensing is performed to sense various contact forces by an object.

SUMMARY OF THE INVENTION

In the related art, there has been a problem that when proximity sensing is performed together with tactile sensing, a device configuration is large by mounting sensors separately and a sensing mechanism is complicated by requiring a complicated detection principle.

Preferred embodiments of the present invention provide tactile and proximity sensors each capable of sensing both contact with and proximity to an object by a simple mechanism.

A tactile and proximity sensor according to a preferred embodiment of the present invention senses contact with and proximity to an object corresponding to a result of reception of light. The tactile and proximity sensor includes a light source, a light receiver, an elastic structure, and a reflecting mirror. The light source emits light. The light receiver receives light and generates a signal indicating the result of reception of the light. The elastic structure includes an elastic body that is deformable in response to an external force and includes a reflecting portion to reflect light and a transmitting portion to transmit light. The reflecting mirror faces the light source to guide the light from the light source to the reflecting portion and the transmitting portion.

With the tactile and proximity sensor according to a preferred embodiment of the present invention, it is possible to sense both contact with and proximity to an object by a simple mechanism in which the reflecting mirror guides light to the reflecting portion and the transmitting portion of the elastic member.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of tactile and proximity sensors according to preferred embodiments of the present invention will be described with reference to the accompanying drawings.

It will be appreciated that each preferred embodiment is illustrative and that partial substitutions or combinations of the configurations described in the different preferred embodiments are possible. In Preferred Embodiment 2 and in the subsequent preferred embodiments, descriptions of matters common to those in Preferred Embodiment 1 will be omitted, and only different points will be described. In particular, similar operation and advantages according to the same configuration will not be described one by one for each preferred embodiment.

Preferred Embodiment 1

In Preferred Embodiment 1, as an example of a tactile and proximity sensor according to the present invention, an optical sensor that provides both tactile sensing and proximity sensing in a simple optical mechanism will be described. Note that the sensing of the contact by the tactile and proximity sensor may be to sense the degree of acting force (that is, contact force) by the contact of an object, as well as sensing the presence or absence of the contact by the object.

1. Configuration

Figure 1:
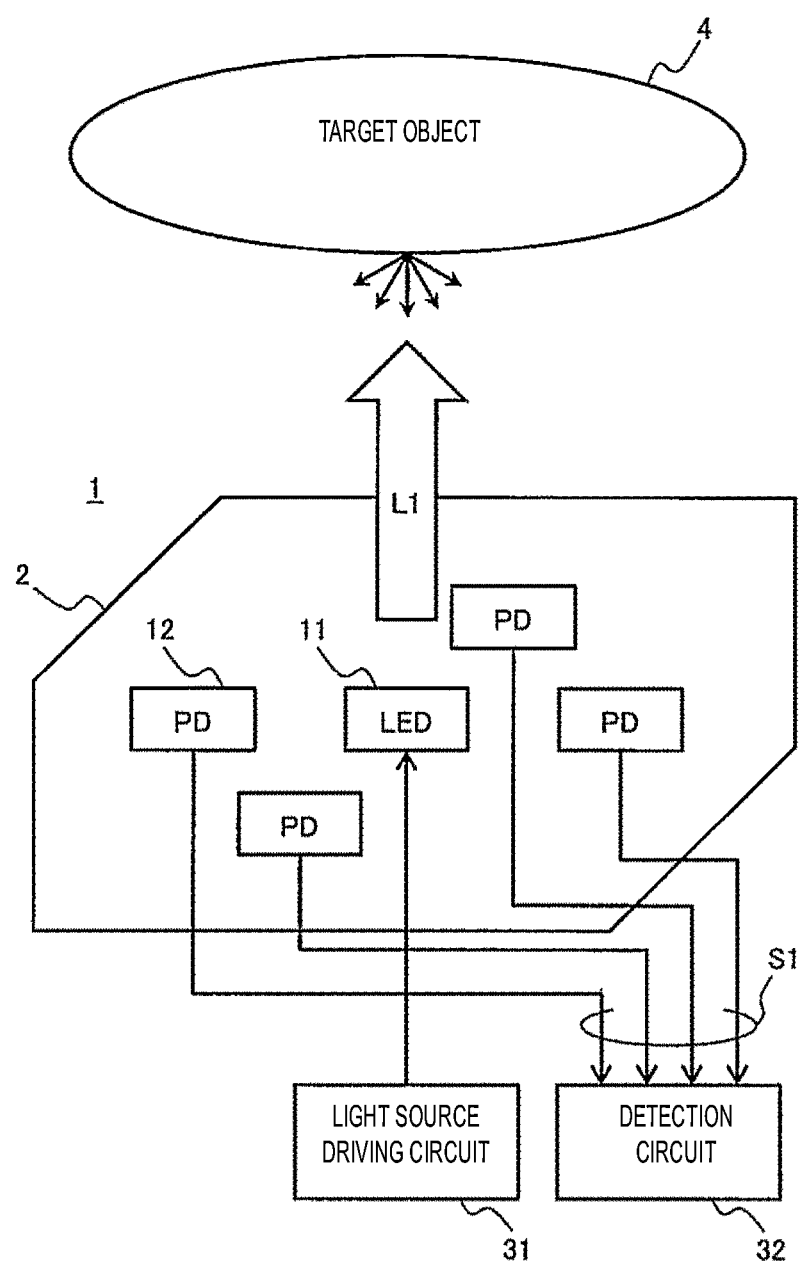
FIG. 1 is a diagram for describing an overview of an optical sensor according to Preferred Embodiment 1 of the present invention.

A configuration of an optical sensor according to Preferred Embodiment 1 will be described with reference to FIG. 1. FIG. 1 is a diagram for describing an overview of an optical sensor 1 according to the present preferred embodiment.

The optical sensor 1 of the present preferred embodiment includes, for example, a light source 11 such as a light emitting diode (LED), a light reception unit 12 such as a photodiode (PD), and an elastic member 2 covering the light source 11 and the light reception unit 12, as illustrated in FIG. 1. The optical sensor 1 of the present preferred embodiment is an example of an optical tactile and proximity sensor in which the light source 11 generates detection light L1 and the light reception unit 12 outputs a light reception signal S1 inside the elastic member 2. The optical sensor 1 is applicable to, for example, a robot hand which grips various objects as a target object 4 to be sensed.

The elastic member 2 of the optical sensor 1 includes various elastic bodies that deform in accordance with an external force such as a contact force exerted by the contact of the target object 4. The optical sensor 1 performs tactile sensing to detect various contact forces by outputting, as the light reception signal S1, a result of reception of light that changes in accordance with the deformation of the elastic member 2. Further, in order to achieve proximity sensing in which the target object 4 is detected, by using the light reception signal S1, in a state where the target object 4 is spaced apart in the vicinity of the elastic member 2, the optical sensor 1 of the present preferred embodiment makes a portion of the detection light L1 transmit through the elastic member 2.

In the tactile and proximity sensing as described above, the detection light L1 may diffuse when emitted out of the optical sensor 1 for the proximity sensing. The intensity of the diffused light rapidly weakens with the increase in distance, and the intensive research by the inventor of the present application has made clear the problem that it is difficult to widen the distance range to be targeted in the proximity sensing. Therefore, in the present preferred embodiment, the optical sensor 1 has a structure to guide the detection light L1 so as to reduce or prevent diffusion, and facilitates achieving both the proximity sensing and the tactile sensing.

Hereinafter, the configuration of the optical sensor 1 will be described in detail.

In the optical sensor 1, the light source 11 emits, as the detection light L1, light in a predetermined wavelength band, such as an infrared region. The light source 11 is not limited to the LED, and may include, for example, various solid-state light emitting elements such as a single- or multi-emitter vertical cavity surface emitting laser (VCSEL), various kinds of semiconductor laser diodes (LDs). The light source 11 may include a plurality of light emitting elements.

The light reception unit 12 includes one or a plurality of light receiving elements, and each light receiving element receives light such as the detection light L1 and generates a light reception signal S1 which is a signal indicating the result of reception of the light. The light reception unit 12 is not limited to the PD and may include, for example, various light receiving elements such as a position sensitive detector (PSD) or a CMOS image sensor (CIS). The light reception unit 12 may include a linear array or a two-dimensional array of light receiving elements.

In addition to the above configuration, the optical sensor 1 according to the present preferred embodiment may further include a light source driving circuit 31 and a detection circuit 32. Note that the optical sensor 1 may include one of the light source driving circuit 31 and the detection circuit 32 or may be provided as a module separate from the light source driving circuit 31 and the detection circuit 32.

The light source driving circuit 31 drives the light source 11 and causes the light source 11 to emit the detection light L1. The light source driving circuit 31 may include, for example, a modulator of AM modulation and the like. For example, the light source driving circuit 31 may modulate the detection light L1 by using a specific frequency in 10 Hz to 1 MHz and the like as a modulation frequency to periodically change the amplitude of light. The modulation of the detection light L1 makes it easy to distinguish the detection light L1 from external light of the external environment.

The detection circuit 32 detects, based on the light reception signal S1 from the light reception unit 12, the result of reception of the detection light L1 and analyzes the contact and the proximity. The detection circuit 32 may include, for example, a filter, such as a band pass filter, that allows a signal component including a modulation frequency of the detection light L1 to pass through or may use synchronous detection. By blocking a constant DC component in the detection circuit 32, it is possible to separate the detection light L1 from the external light and analyze the detection light L1.

The modulation frequency of the detection light L1 can be appropriately set to a frequency not used in an existing external system, for example, 38 kHz used as a carrier of an infrared remote controller. This makes it possible to reduce or prevent malfunction of the optical sensor 1 caused by the external system.

1-1. Structure of Optical Sensor

Figure 2:
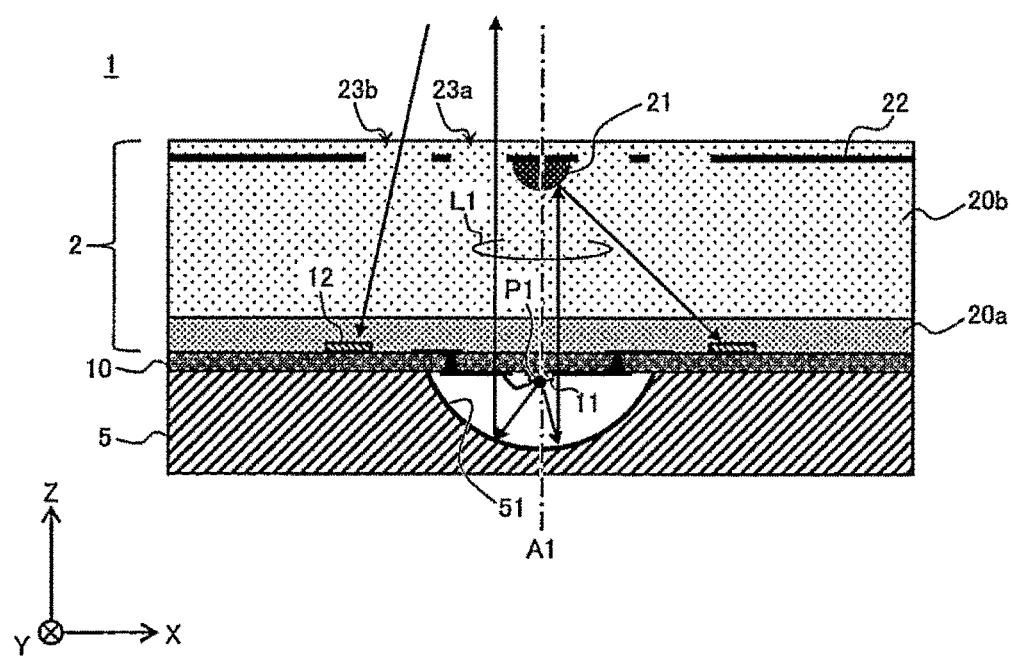
FIG. 2 is a sectional view illustrating a structure of the optical sensor according to Preferred Embodiment 1 of the present invention.

A structure of the optical sensor 1 according to Preferred Embodiment 1 will be described with reference to FIGS. 2 and 3. FIG. 2 is a sectional view illustrating a structure of the optical sensor 1 according to the present preferred embodiment. FIGS. 3A and 3B illustrate various plan views for describing the structure of the optical sensor 1.

As illustrated in FIG. 2, the optical sensor 1 of the present preferred embodiment includes a concave mirror 51 to guide the detection light L1 from the light source 11 on a reflective substrate 5 provided on a side opposite to the elastic member 2 being possible to be in contact with the target object 4 or the like. In addition, in the present preferred embodiment, a transparent substrate 10 is provided between the elastic member 2 and the reflective substrate 5. The transparent substrate 10 is a glass substrate or the like that transmits the detection light L1 and has a main surface adjacent to the elastic member 2 and a main surface adjacent to the reflective substrate 5.

In the following description, two respective directions parallel or substantially parallel to the main surfaces of the transparent substrate 10 are referred to as an X direction and a Y direction, and a direction normal to the main surface is referred to as a Z direction. In addition, the +Z side which is the elastic member 2 side from the transparent substrate 10 may be referred to as an upper side, and the −Z side which is a reflective substrate 5 side may be referred to as a lower side.

In the present preferred embodiment, each of the light receiving elements of the light reception unit 12 is provided on the main surface on the upper side of the transparent substrate 10 so as to face the light reception surface to receive light upward. On the other hand, the light source 11 is provided on the main surface on the lower side of the transparent substrate 10 so as to face the concave mirror 51 and so as to, for example, emit the detection light L1 downward. A wiring pattern, such as a metal electrode connected to the light source 11 and the light reception unit 12 and the like are provided on the transparent substrate 10. FIG. 3A illustrates the wiring pattern in a plan view of the transparent substrate 10.

Figure 3A:
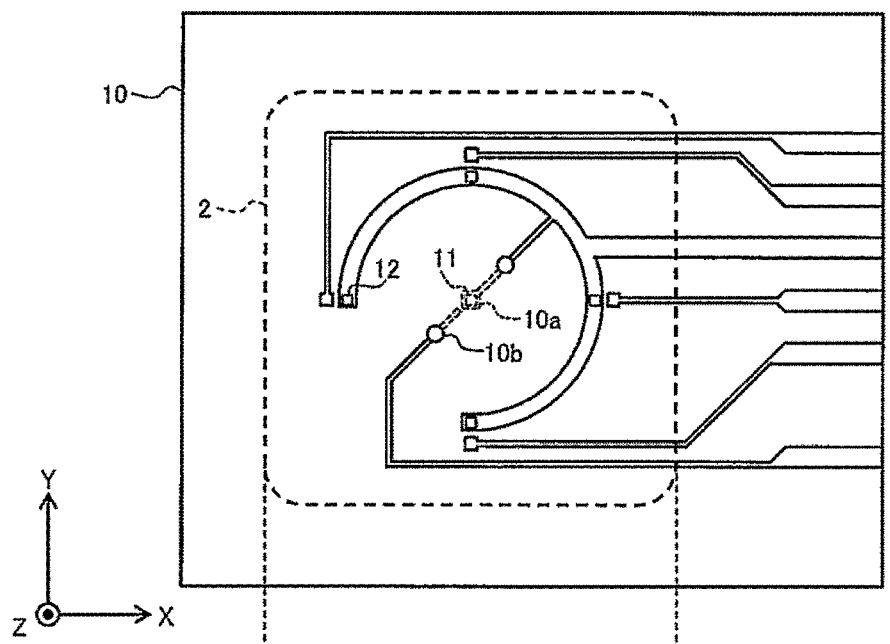
FIGS. 3A and 3B are plan views for describing a structure of the optical sensor according to Preferred Embodiment 1 of the present invention.
Figure 3B:
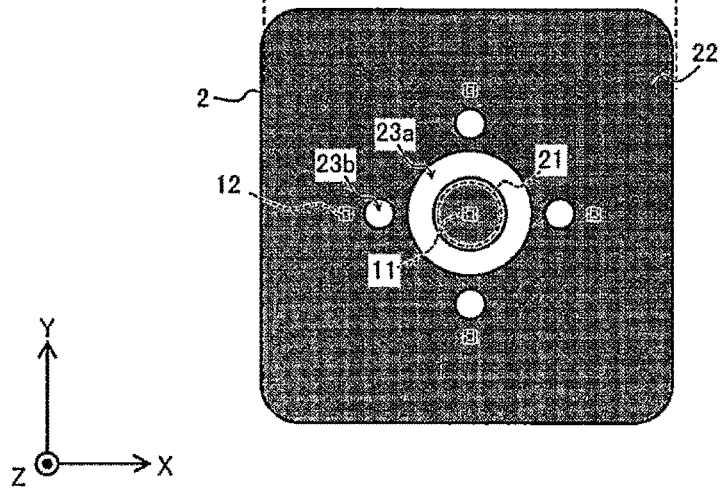

In the example illustrated in FIG. 3A, light reception units 12 are disposed symmetrically with respect to the light source 11 at four positions on the ±X sides and the ±Y sides of the light source 11. Further, the wiring to the light source 11 is provided through a via 10b. Each of the terminal electrodes of the light source 11 and the light reception unit 12 can be connected by a variety of methods such as solder, conductive paste, wire bonding, flip chip and the like. The various electrodes are connected to an external terminal through a feed such as a through-hole, as necessary.

As illustrated in FIG. 3A, the light source 11 is mounted on, for example, a metal electrode 10a, which is the wiring pattern, of the transparent substrate 10. Accordingly, it is possible to inhibit the light emitted from the light source 11 from being directly emitted upward without being reflected by the concave mirror 51. Note that the wiring illustrated in FIG. 3A is merely an example, and the wiring is not limited thereto. For example, the position of the via 10b and the like may be appropriately changed. The number or arrangement of the light reception units 12 is also not limited to the example illustrated in FIG. 3A.

The transparent substrate 10 is not particularly limited to a glass substrate and can be configured of various hard materials that transmit light having the same wavelength as the detection light L1. For example, an organic material such as acrylic, polycarbonate (PC), or polyimide (PI) may be used for the transparent substrate 10, and a semiconductor substrate such as a Si substrate or a GaAs substrate may also be used depending on the wavelength band of the detection light L1.

Referring back to FIG. 2, the reflective substrate 5 includes a main surface on which the concave mirror 51 is formed and which is bonded to the main surface on the lower side of the transparent substrate 10. For example, the concave mirror 51 preferably has a parabolic surface shape that is rotationally symmetric around the direction normal to the reflective substrate 5, that is, the Z direction. The concave mirror 51 has a focal point P1 based on the parabolic surface and a central axis A1 that extends in the Z direction and passes through the focal point P1. The concave mirror 51 is an example of a first reflecting mirror in the present preferred embodiment.

The transparent substrate 10 and the reflective substrate 5 are aligned and pasted so that the light source 11 is positioned at the focal point P1 of the concave mirror 51, for example. Accordingly, when the detection light L1 emitted from the light source 11 is reflected by the concave mirror 51 and is emitted upward from the optical sensor 1, it is possible to collimate the detection light L1 in the Z direction. The size of the concave mirror 51 is appropriately set in accordance with the dimensions of the light source 11 or the like.

For manufacturing the concave mirror 51 in the reflective substrate 5, a manufacturing technique of a microlens array or the like can be used. For example, by using a technique such as wet etching, mold pressing, nanoimprinting, or the like, a concave surface is formed on a plate-shaped substrate formed of a material such as glass, quartz, resin, or the like, the concave surface is subjected to metallization, and thus the concave mirror 51 can be manufactured. Note that the concave mirror 51 is not limited to the reflective substrate 5 and can be appropriately manufactured by various members. For example, it is also possible to manufacture the concave mirror 51 by processing the metal by pressing, forging, or the like. The material of the reflective substrate 5 may have, for example, a coefficient of thermal expansion (CTE) equal to or less than 10.

The elastic member 2 includes, for example, a plurality of transparent layers 20a and 20b, a reflector 21, and a shadow mask 22 as a transparent elastic body. For example, of the two of transparent layers 20a and 20b, the hard or relatively hard transparent layer 20a is laminated on the transparent substrate 10 so as to cover the light reception unit 12, and the relatively soft transparent layer 20b is laminated on the hard transparent layer 20a. Each of the transparent layers 20a and 20b includes, for example, a transparent resin having a light-transmitting property in a wavelength band of the detection light L1 and having various elastic properties. With the hard transparent layer 20a, it is possible to easily protect the light reception unit 12 from mechanical stress. The hard transparent layer 20a (being provided for protecting the light reception unit 12) may only cover each element of the light reception unit 12 and the periphery of a connecting portion. Further, the number of the transparent layers 20a and 20b in the elastic member 2 may be one. Hereinafter, the transparent layers 20a and 20b will be collectively referred to as a "transparent layer 20".

The upper surface of the elastic member 2 is preferably flat along the YX plane, for example. Accordingly, the light from the concave mirror 51 can be emitted to the outside of the optical sensor 1 while maintaining a collimated state, and simplification in the optical design of the optical sensor 1 can be facilitated. The elastic member 2 may be formed by molding the transparent layer into a predetermined shape, and may have, for example, a prismatic shape, a columnar shape, a truncated cone shape, or a truncated pyramid shape. Further, the elastic member 2 may be provided by uniformly disposing the transparent layer 20 on the main surface of the transparent substrate 10. Note that the elastic member 2 may not have a flat upper surface and may have, for example, a hemispherical shape or the like.

The reflector 21 is provided to reflect the detection light L1 inside the elastic member 2 to provide for tactile sensing of the optical sensor 1. The reflector 21 is located on the central axis A1 of the concave mirror 51, for example, on the upper portion of the transparent layer 20. The reflector 21 includes a material having optical characteristics that diffusely or specularly reflect light having the same wavelength band as the detection light L1 by the light source 11 and includes, for example, a metal, a reflective resin, or the like. The reflector 21 may have a projection shape, a flat shape, or a concave shape. The reflector 21 is an example of a reflecting portion in the elastic member 2.

The shadow mask 22 is provided, for example, inside or on the upper surface of the transparent layer 20 above the reflector 21. The shadow mask 22 includes a material having optical characteristics to absorb light having the same wavelength band as that of the detection light L1, for example, a black resin or the like. For example, by providing a plurality of openings in the shadow mask 22, an optical window 23a for light emission and an optical window 23b for light reception are provided. The optical windows 23a and 23b are an example of a transmitting portion of the elastic member 2. In the plan view of the elastic member 2 illustrated in FIG. 3B, an example arrangement of each of the optical windows 23a and 23b corresponding to the example illustrated in FIG. 3A is illustrated.

The optical window 23a for light emission defines a transmission region through which the detection light L1 emitted from the light source 11 to the outside passes. In the example of FIG. 3B, the optical window 23a for light emission is defined by an opening provided annularly around the reflector 21 in the shadow mask 22. The opening is not limited to an annular shape, and may have a circular shape including a region of the reflector 21. The size of the optical window 23a for light emission is appropriately set in consideration of the amount of light to be emitted from the light source 11 and the concave mirror 51 to the outside through the optical window 23a, and the like.

The optical window 23b for light reception defines a transmission region through which light incident to the light reception unit 12 from the outside passes, such as reflected light of the detection light L1 in the target object 4. In the present example, the optical window 23b for light reception includes four openings provided symmetrically with respect to the position of the light source 11 in the shadow mask 22 corresponding to the four light reception units 12. For example, the optical window 23b for light reception is arranged such that the distance to the light source 11 in the XY plane is smaller than the distance between the light reception unit 12 and the light source 11 by a predetermined ratio. The ratio and the size of the optical window 23b for light reception are appropriately set in consideration of a distance in the Z direction that is to be targeted in the proximity sensing according to the light received by the light reception unit 12 through the optical window 23b.

According to the shadow mask 22, in the optical sensor 1, the light reception unit 12 can be shaded as much as possible from external light or the like. In a case that the external light is extremely strong or severely changed, a light receiving element such as a PD may be saturated, and malfunction may occur. On the other hand, in the optical sensor 1 according to the present preferred embodiment, due to the shading of the shadow mask 22, it is possible to suppress malfunction caused by the external light or the like.

The detection light L1 from the light source 11 of the optical sensor 1 described above is reflected by the concave mirror 51, and the detection light L1 is emitted along the Z direction. With this, it is possible to reduce the dependency of the radiation characteristics of the light source 11 and the refractive index of the elastic member 2 or the like in optical design of the optical sensor 1, and to facilitate simplification in the optical design. According to the structure described above, it is possible to manufacture the optical sensor 1 in a unit of a wafer, a panel, or the like. Therefore, the manufacturing process of the optical sensor 1 can be simplified, and thus the manufacturing cost can be reduced.

Further, in the optical sensor 1 of the present preferred embodiment, since the light source 11 is provided on the main surface of the transparent substrate 10 on the side opposite to the elastic member 2, it is possible to avoid the influence of stress or the like on the light source 11 when the elastic member 2 is deformed due to a contact force or the like in, for example, tactile sensing. Therefore, it is easy to secure resistance to failure, that is, the reliability of the optical sensor 1. The light source 11 may be hermetically sealed between the transparent substrate 10 and the reflective substrate 5. This makes it possible to improve the reliability of the optical sensor 1.

2. Operation

The operation of the optical sensor 1 as described above will be described below.

The light source 11 of the optical sensor 1 emits the detection light L1, for example, by driving the light source driving circuit 31 (FIG. 1). For example, as illustrated in FIG. 2, the detection light L1 from the light source 11 enters the concave mirror 51, and is reflected upward from the concave mirror 51 in the Z direction. In the detection light L1 reflected by the concave mirror 51, for example, the light in the vicinity of the central axis A1 enters the reflector 21, and the light of the peripheral edge enters the optical window 23a for light emission.

The detection light L1 incident on the reflector 21 is reflected and can reach the light reception unit 12. When the shape of the elastic member 2 changes, a position, an orientation, and the like of the reflector 21 vary, and a direction or an angle in which the reflector 21 reflects the detection light L1 also changes. Therefore, the result of reception of the detection light L1 from the reflector 21 in the light reception unit 12 changes according to the state in which the elastic member 2 is deformed due to the contact force by the target object 4, and thus the tactile sensing can be performed by the output of the light reception signal S1.

For example, in the detection circuit 32, it is possible to detect various contact forces by analyzing the fluctuation of the signal levels of the light reception signal S1 from each of the light receiving elements of the light reception unit 12. As an analysis method, a known technique can be applied as appropriate (see, for example, Japanese Patent No. 5825604 and International Publication No. 2014/045685).

The light incident on the optical window 23a for light emission from the concave mirror 51 passes through the elastic member 2 and is emitted to the outside of the optical sensor 1. The detection light L1 emitted from the optical sensor 1 reaches, for example, the target object 4, and is diffusely reflected, so that the reflected light of the detection light L1 in the target object 4 may be emitted toward the optical sensor 1. When the reflected light from the target object 4 enters the optical window 23b for light reception in the optical sensor 1, the reflected light may be received by the light reception unit 12 in accordance with the positional relationship between the target object 4 and the optical sensor 1. In the optical sensor 1, the proximity sensing of the target object 4 can be performed by outputting a signal of the result of reception of the detection light L1 reflected by the target object 4.

For example, the detection circuit 32 can detect, based on the light reception signal S1, whether the target object 4 is present in a predetermined distance range. The distance may be estimated based on the signal intensity of the light reception signal S1. Alternatively, the predetermined distance range may be set according to triangulation corresponding to the arrangement of the optical windows 23a, 23b, and the like. In that case, the detection circuit 32 can calculate the distance to the target object 4 by performing calculation based on the triangulation. The detection circuit 32 can also detect whether or not the target object 4 is approaching based on the temporal change of the light reception signal S1.

As described above, according to the optical sensor 1 of the present preferred embodiment, it is possible to achieve both the tactile sensing and the proximity sensing in the single optical sensor 1 by the simple optical mechanism of the elastic member 2 and the concave mirror 51. For example, it is possible to detect a series of movements in which the target object 4 reaches the proximity and further reaches close to be in a contact state by the same sensor without any break.

According to the optical sensor 1 of the present preferred embodiment, since the detection light L1 is collimated and emitted to the outside by the concave mirror 51, the diffusion and the light loss of the detection light L1 corresponding to the distance of the target object 4 in the proximity sensing described above can be reduced or prevented. Therefore, the proximity sensing can be performed efficiently, and it is easy to widen the target distance range. For example, in a case of the target object 4 with a non-specular body, the intensity of the reflected light that can be reflected and received weakens in inverse proportion to the second power of the distance to the target object 4, but also in this case, proximity sensing can be achieved.

In addition, in the operation of the optical sensor 1 as described above, it is conceivable that external light such as external ambient light enters into the optical sensor 1 when the detection light L1 is extracted to the outside to achieve proximity sensing and the reflected light is taken into the inside. On the other hand, by modulating the detection light L1 in the light source driving circuit 31, it is possible to distinguish the reflected light of the detection light L1 which is a signal from the external light which is a disturbance in the detection circuit 32.

3. Conclusion

As described above, the optical sensor 1 according to the present preferred embodiment is the tactile and proximity sensor that senses contact with and proximity to a target object according to a result of reception of light. The optical sensor 1 includes the light source 11, the light reception unit 12, the elastic member 2, and the concave mirror 51. The light source 11 emits the detection light L1. The light reception unit 12 receives light and generates a light reception signal S1 indicating a result of reception of the light. The elastic member 2 includes an elastic body such as a transparent layer 20 or the like that deforms in accordance with an external force. The elastic member includes the reflector 21 defining and functioning as a reflecting portion to reflect light, and each of the optical windows 23a and 23b defining and functioning as transmitting portions to transmit light. The concave mirror 51 faces the light source 11 to guide the detection light L1 from the light source 11 to the reflecting portion and the transmitting portion.

According to the optical sensor 1 described above, by a simple mechanism in which the concave mirror 51 guides light to the reflecting portion and the transmitting portion of the elastic member 2, it is possible to sense both the contact with and the proximity to an object, such as the target object 4. In the tactile sensing, the detection light L1 from the light source 11 in the elastic member 2 can be efficiently collected in the reflector 21 through the concave mirror 51, and effective utilization and high efficiency of the light emission power can be achieved. The light receiving power is also increased, and an improvement in a signal to noise ratio (S/N ratio) is also possible.

In addition, in the proximity sensing, the detection light L1 emitted from the light source 11 is guided by the concave mirror 51 to the outside through the transmitting portion, so that it is possible to transmit the detection light L1 without diffusing to a distant position, thereby making it possible to lengthen the distance range to be sensed. According to the optical sensor 1 of the present preferred embodiment, it is possible to perform the mounting more accurately than the proximity sensing technology that requires a complicated optical design in the related art. Further, the two sensing functions described above can be achieved by the same device configuration, and the size of the sensor can be reduced.

In the present preferred embodiment, the concave mirror 51, which is an example of the first reflecting mirror, preferably has a concave shape so as to collimate the detection light L1 emitted from the light source 11. For example, the light source 11 is disposed at the position of the concave focal point P1 by the parabolic surface, whereby the detection light L1 emitted from the concave mirror 51 is parallel light, and diffusion of the detection light L1 emitted from the optical sensor 1 to a distant position can be reduced or prevented. The shape of the concave mirror 51 and the position of the light source 11 may have a tolerance as appropriate to such an extent that the diffusion of the detection light L1 can be reduced or prevented within the distance range of the proximity sensing.

In the present preferred embodiment, the optical sensor 1 further includes the transparent substrate 10 that is a substrate provided between the elastic member 2 and the concave mirror 51. The transparent substrate 10 includes a main surface on the elastic member 2 side and a concave mirror 51. The light source 11 is provided on the main surface of the transparent substrate 10 on the concave mirror 51 side. That is, the light source 11 is not located on the elastic member 2 side where the stress is generated when the target object 4 is in contact. This makes it possible to increase the reliability of the optical sensor 1 without exerting the influence of stress on the light source 11 at the time of tactile sensing. Further, the light source 11 is enclosed between the reflective substrate 5, such as a metal thin film and the transparent substrate 10, such as glass, and a high level airtight structure can be easily achieved.

In the present preferred embodiment, the light reception unit 12 is provided on the main surface of the transparent substrate 10 on the elastic member 2 side. This makes it possible to make the mounting positions of the light source 11 and the light reception unit 12 different from each other, and to make it difficult for stray light generated from the light source 11 to reach the light reception unit 12. Therefore, it is possible to improve the S/N ratio of the light received by the light reception unit 12.

In the present preferred embodiment, the transmitting portion of the optical sensor 1 includes an optical window 23a for light emission and an optical window 23b for light reception. The optical window 23a for light emission is an example of a first transmission region through which the detection light L1 emitted from the light source 11 and emitted to the outside passes. The optical window 23b for light reception is an example of a second transmission region through which the light incident on the light reception unit 12 from the outside passes. The angle at which the reflected light of the detection light L1 with respect to the Z direction emitted from the detection light L1 is incident can be regulated within a predetermined angle range by the arrangement and size of each of the optical windows 23a and 23b. According to the triangulation method in the angle range, it is possible to perform proximity sensing that can easily measure the distance.

The optical sensor 1 according to the present preferred embodiment may further include the light source driving circuit 31 and the detection circuit 32. The light source driving circuit 31 is an example of a modulation circuit that modulates the detection light L1 emitted from the light source 11. The detection circuit 32 detects, based on the light reception signal S1, the result of reception of the light modulated by the light source driving circuit 31. This makes it possible to distinguish the reflected light of the detection light L1 from the target object 4 from the external light.

Preferred Embodiment 2

In Preferred Embodiment 1, the optical sensor 1 including the concave mirror 51 to guide the detection light L1 from the light source 11 has been described. In Preferred Embodiment 2, an optical sensor including a concave mirror to guide light to the light reception unit 12 will be described with reference to FIGS. 4 and 5.

Figure 4:
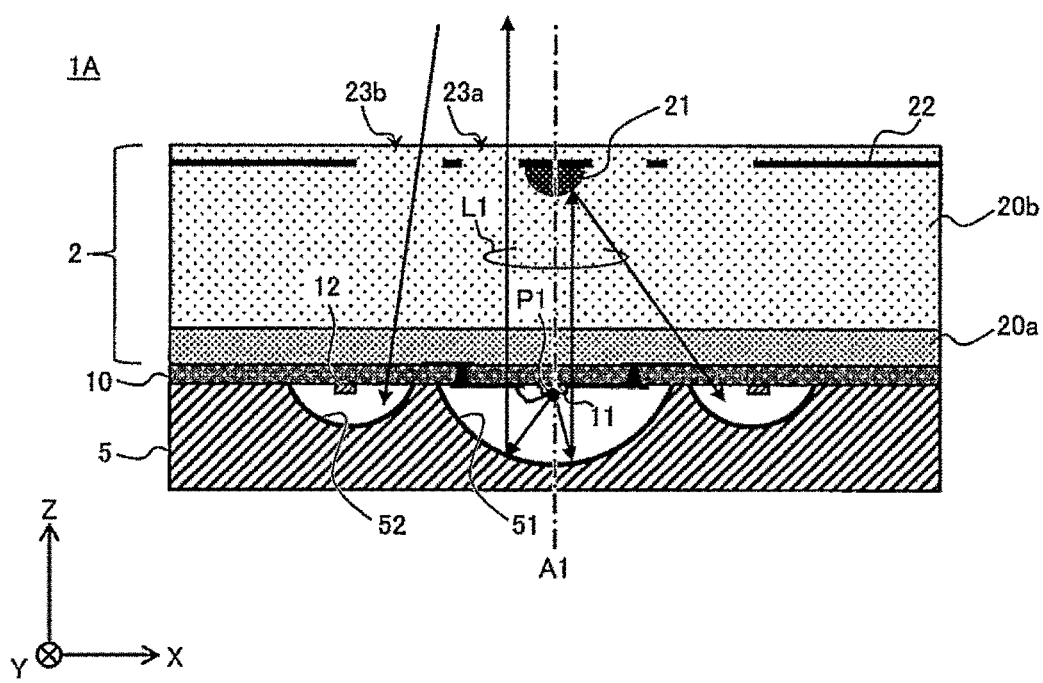
FIG. 4 is a sectional view illustrating a structure of the optical sensor according to Preferred Embodiment 2 of the present invention.

FIG. 4 is a sectional view illustrating a structure of an optical sensor 1A according to Preferred Embodiment 2. In the optical sensor 1A of the present preferred embodiment, in addition to the same configuration as that of the optical sensor 1 of Preferred Embodiment 1, a concave mirror 52 for light reception is further provided. The concave mirror 52 for light reception is an example of a second reflecting mirror in the present preferred embodiment.

In Preferred Embodiment 1, the light reception unit 12 is disposed on the main surface on the side opposite to the light source 11 in the transparent substrate 10. In the present preferred embodiment, the light reception unit 12 is disposed on the main surface of the transparent substrate 10 on which the light source 11 is located on the same side, with the light reception surface facing downward. The light reception unit 12 may be hermetically sealed between the transparent substrate 10 and the reflective substrate 5.

In the example of FIG. 4, a plurality of concave mirrors 52 for light reception are provided so as to face each of the light reception units 12 corresponding to the plurality of light reception units 12 at a plurality of locations. The concave mirror 52 for light reception has a parabolic surface shape, for example, like the concave mirror 51 with respect to the light source 11, and has a focal point and a central axis. The size and the like of the concave mirror 52 for light reception may be appropriately set, and may be smaller than that of the concave mirror 51 for the light source 11, or may be a size equal to or larger than that of the concave mirror 51. Also, even when the distance between the light source 11 and the light reception unit 12 is close and each of the concave mirrors 51 and 52 is large, and the concave mirror 51 for the light source 11 and the concave mirror 52 for light reception are in such a positional relationship as to intersect with each other in design, one of or both of the concave mirrors 51 and 52 may be partially cut out, or the concave mirror may be a partially missing shape by further installing a partition wall.

Figure 5:
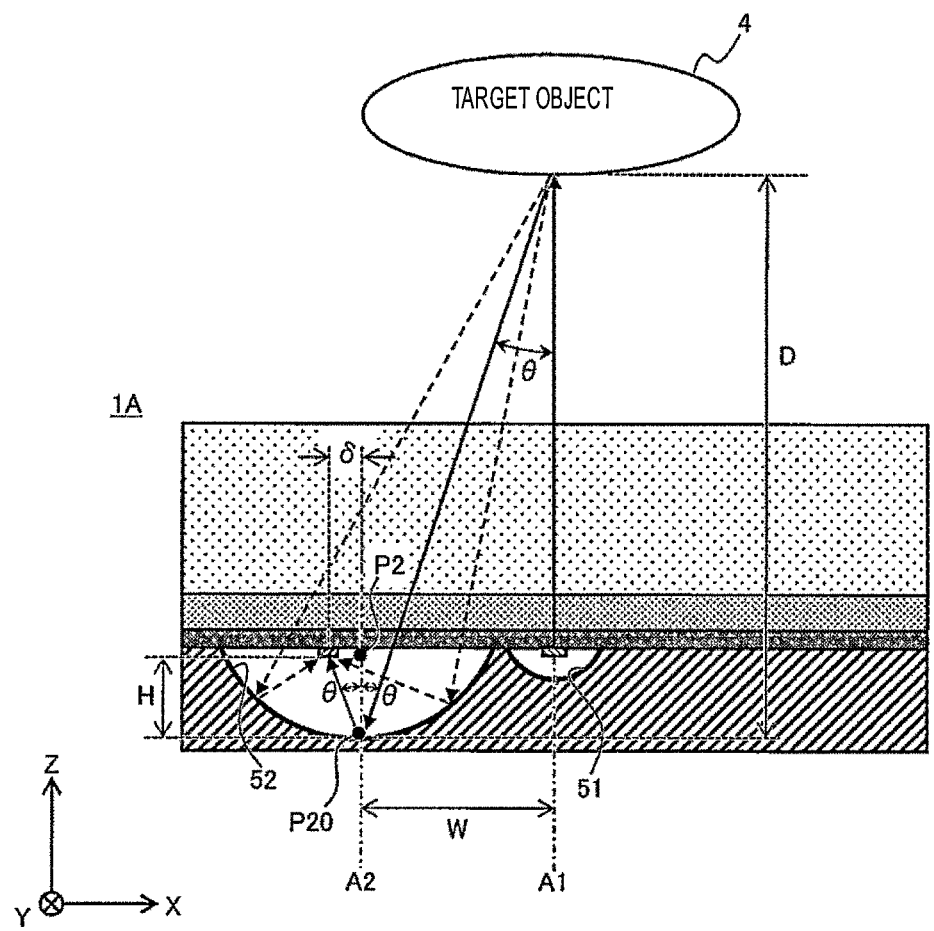
FIG. 5 is a diagram for explaining an arrangement of a light reception unit in the optical sensor according to Preferred Embodiment 2 of the present invention.

FIG. 5 is a diagram for describing the arrangement of the light reception unit 12 in the optical sensor 1A according to the present preferred embodiment. In the example of FIG. 5 the light reception unit 12 is spaced from the light source 11 by a distance δ from the focal point P2 on the central axis A2 of the concave mirror 52 for light reception. The interval δ is set based on the following equation (1).

$$\delta = w \times H/D \tag{1}$$

In the above equation (1), W is a distance between a central axis A1 of the concave mirror 51 for the light source 11 (in the XY plane) and a central axis A2 of the concave mirror 52 for light reception. H denotes a distance from the center point P20 of the concave mirror 52 for light reception in the Z direction to the light reception unit 12. D is a distance from the center point P20 of the concave mirror 52 for light reception in the Z direction to the target object 4 assumed to be a sensing target. The above equation (1) is satisfied based on the angle θ defined by the optical path in which the reflected light of the detection light L1 in the target object 4 reaches the center point P20 with the Z direction, by W/D=δ/H=tan θ.

According to the above equation (1), it is possible to guide the reflected light of the detection light L1 in the target object 4 to the light reception unit 12 near the distance D assumed in the proximity sensing. Further, by appropriately setting the position and the like of the reflector 21, it is also possible to guide the reflected light of the detection light L1 in the reflector 21 to the light reception unit 12 for tactile sensing. The shape of the concave mirror 52 for light reception and the position of the light reception unit 12 can be appropriately set within the range of tolerance.

Further, a concave mirror that blurs the focal point P2 of the concave mirror 52 for light reception may be included. For example, the shape of the concave mirror 52 may be distorted from a parabolic surface, or a concave shape of multiple focal points, such as a double focal point, may be included.

As described above, the optical sensor 1A of the present preferred embodiment further includes the concave mirror 52 for light reception. The concave mirror 52 for light reception is an example of the second reflecting mirror disposed facing the light reception unit 12 so as to guide light, such as the reflected light of the detection light L1 from the target object 4, to the light reception unit 12. Accordingly, the reflected light from the target object 4 can be easily received by the light reception unit 12, and a distance range of the proximity sensing can be more easily increased. Further, the efficiency of the light reception is improved, and the size of the light reception unit 12 can be reduced.

In the present preferred embodiment, the light reception unit 12 is provided on the main surface on the concave mirror 51 side of the transparent substrate 10. Accordingly, it is possible to avoid the influence of stress from being exerted on the light reception unit 12 during the tactile sensing, and improve the reliability of the optical sensor 1A.

Preferred Embodiment 3

In the optical sensors 1 and 1A according to Preferred Embodiment 1 and Preferred Embodiment 2, the transparent elastic member 2 is included. In Preferred Embodiment 3, an optical sensor including another example of an elastic member will be described with reference to FIG. 6.

Figure 6:
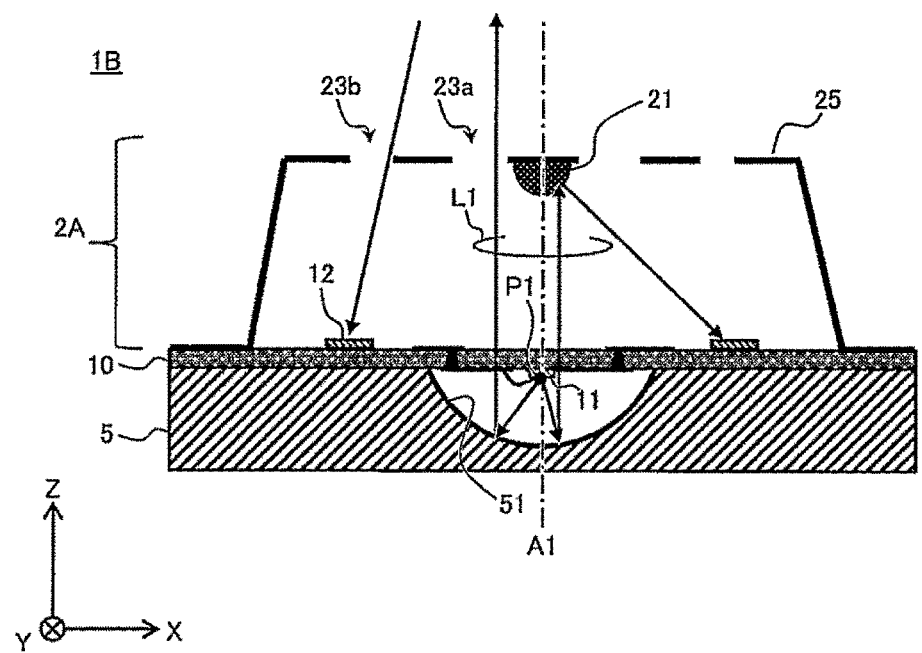
FIG. 6 is a sectional view illustrating a structure of the optical sensor according to Preferred Embodiment 3 of the present invention.

FIG. 6 is a sectional view illustrating a structure of an optical sensor 1B according to Preferred Embodiment 3. The optical sensor 1B of the present preferred embodiment includes, in the same configuration as in Preferred Embodiment 1, an elastic member 2A by a spring structure 25 such as a leaf spring instead of the elastic member 2 (FIG. 2) by the transparent layer 20 as an elastic body, for example. The spring structure 25 is an example of an elastic body configured of, for example, metal or the like. The material of the spring structure 25 is not particularly limited, and may be, for example, a resin that does not have light translucency in the wavelength band of the detection light L1.

In the present embodiment, the spring structure 25 of the elastic member 2 protrudes upward from the transparent substrate 10. For example, the reflector 21 can be fixed to the upper surface of the spring structure 25 as in Preferred Embodiment 1. Further, each of the optical windows 23a and 23b may be provided by an opening on the upper surface of the spring structure 25.

The optical sensor 1B according to the present preferred embodiment can achieve both the tactile sensing and the proximity sensing by a simple mechanism, similarly as with the optical sensors 1 and 1A according to Preferred Embodiment 1 and Preferred Embodiment 2.

Other Preferred Embodiments

In the above-described Preferred Embodiment 1 to Preferred Embodiment 3, examples in which the concave mirror 51 has the parabolic surface shape has been described, but the concave mirror 51 is not limited to a parabolic surface, and may have various shapes. The present modification will be described with reference to FIG. 7.

Figure 7:
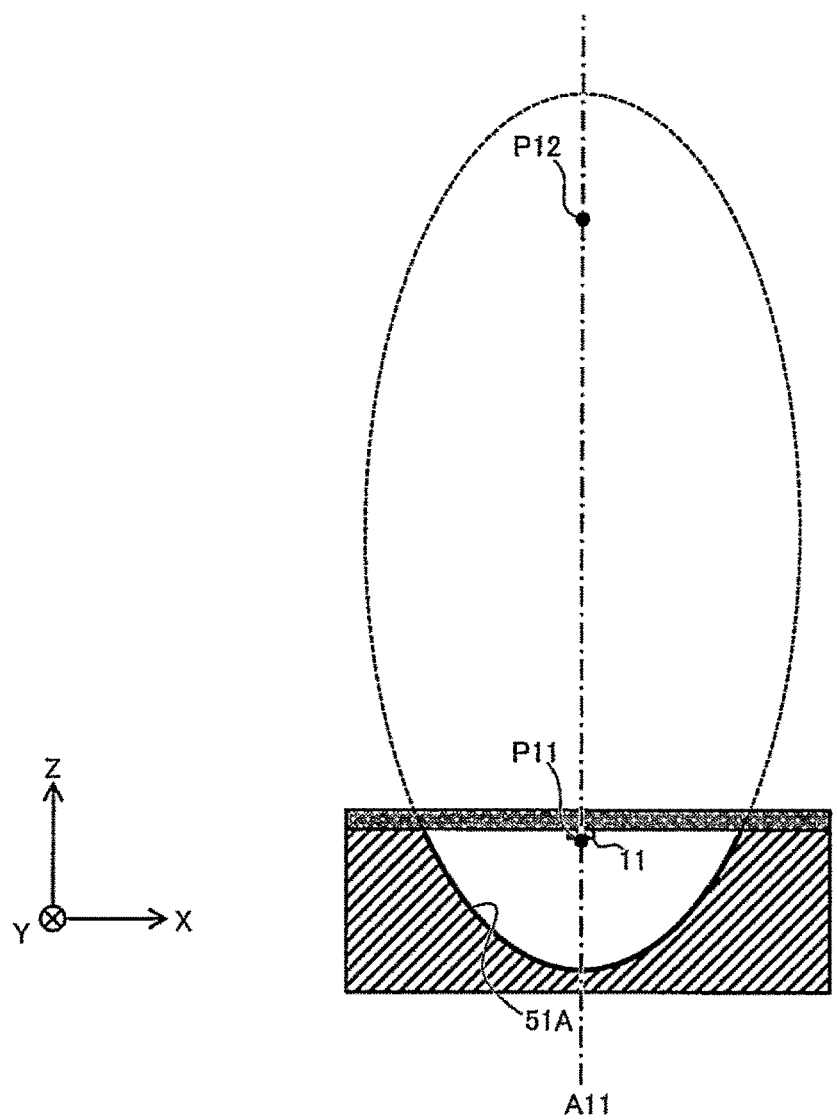
FIG. 7 is a diagram illustrating a modification of a concave mirror in an optical sensor.

FIG. 7 is a diagram for describing the modification of the concave mirror 51 in the optical sensor 1. As illustrated in FIG. 7, a concave mirror 51A of the optical sensor 1 may have an elliptical surface shape. In this case, the concave mirror 51A has a central axis A11 and two focal points P11 and P12 based on an elliptical surface.

For example, the light source 11 is disposed at one focal point P11 closer to the concave mirror 51 of two focal points P11, P12. Accordingly, the detection light L1 can be concentrated in the vicinity of the other focal point P12. The major diameter, the minor diameter and the like of the elliptical surface of the concave mirror 51A can be set as appropriate so as to correspond to the above-described focal point P12 and the distance range to be subjected to the proximity sensing. Note that the influence of the refractive index when the detection light L1 passes through the elastic member 2 or the like can be reduced by, for example, setting the incident angle of the detection light L1 to be sufficiently small, and simplification in the optical design can also be facilitated.

As described above, in the optical sensor 1 of the present preferred embodiment, the concave mirror 51A may have an elliptical surface shape so as to concentrate the detection light L1 from the light source 11. Further, the concave mirror 51A is not limited to an elliptical surface, and may have various concave shapes that concentrate or collimate the detection light L1 from the light source 11. Also, the concave mirror 52 for light reception may have various concave shapes such as an elliptical surface shape, similarly as with the concave mirror 51A for the light source 11.

In addition, in the optical sensor 1, the light reception unit 12 and the like may be mounted on a flip-chip. The present modification will be described with reference to FIG. 8.

Figure 8:
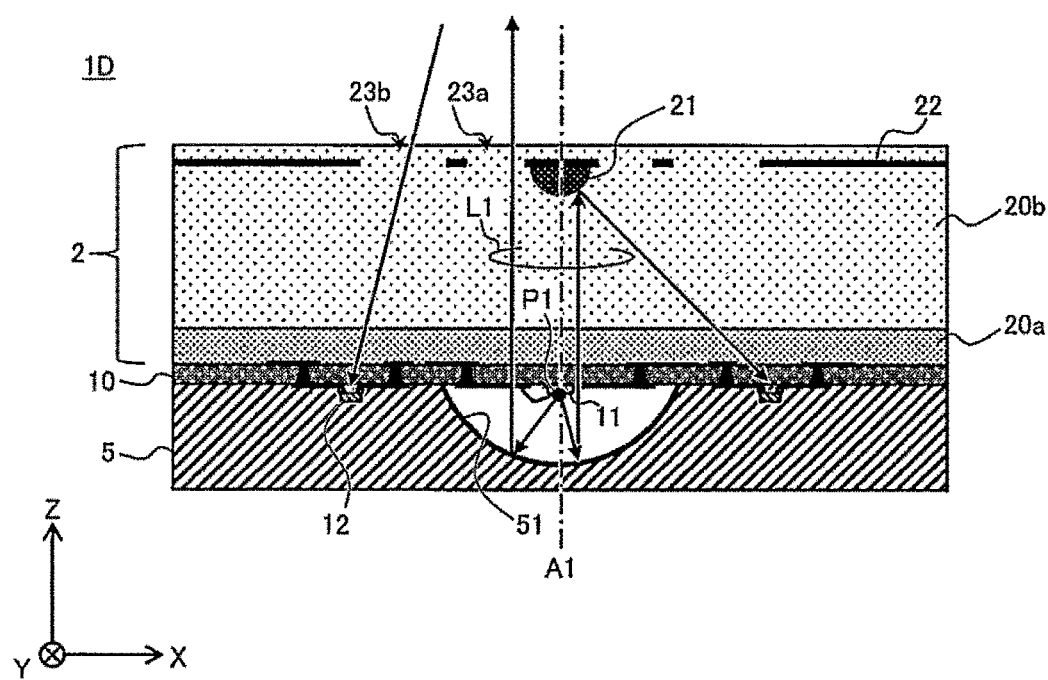
FIG. 8 is a sectional view illustrating a sectional structure of the optical sensor according to the modification.

FIG. 8 illustrates a sectional structure of an optical sensor 1D according to the present modification. In the optical sensor 1D of the present modification, the light reception unit 12 is provided on the main surface on the lower side of the transparent substrate 10 by the same configuration as that in Preferred Embodiment 1. The light reception unit 12 is disposed with a light reception surface facing upward by a flip-chip. Also, the airtightness of the light reception unit 12 can be secured, and receiving light of stray light from the light source 11 can be reduced or prevented.

The flip-chip of the light reception unit 12 is not limited to the above-described configuration, and may be applied to, for example, the configuration of Preferred Embodiment 2. In addition, the light source 11 may be mounted in the form of a flip-chip in the configuration of each preferred embodiment. Even in this case, by appropriately setting the shapes of the various concave mirrors 51, 51A and 52, it is possible to align the opposing light sources 11 or the light reception unit 12 in the vicinity of the focal points P1, P11 and P2.

In each of the above-described preferred embodiments, the optical sensor 1 including the transparent substrate 10 has been described. The optical sensor 1 of the present preferred embodiment does not necessarily have to include the transparent substrate 10. For example, the light source 11 and the light reception unit 12 may be mounted by a bridge leadframe made of metal in place of the transparent substrate 10.

Although the optical sensors 1 and 1A including the shadow mask 22 are described in Preferred Embodiment 1 and Preferred Embodiment 2 in the above, the shadow mask 22 may be omitted. For example, the entire upper surface of the elastic member 2 may include a transmitting portion. Even in this case, the proximity sensing can be achieved by appropriately adopting a configuration that causes the light reception unit 12 to receive the reflected light of the detection light L1.

In each of the above-described preferred embodiments, the tactile and proximity sensor including one optical sensor 1 have been described. In the present preferred embodiment, the plurality of optical sensors 1 may define the tactile and proximity sensor. For example, the tactile and proximity sensor according to the present preferred embodiment may be a sensor array in which a plurality of optical sensors 1 are arranged in a one-dimensional or two-dimensional manner. In the sensor array, the plurality of optical sensors 1 may be individually or integrally constructed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A tactile and proximity sensor for sensing contact with and proximity to an object corresponding to a result of reception of light, the tactile and proximity sensor comprising:
   a light source to emit light;
   a light receiver to receive light and generate a signal indicating a result of reception of the light;
   an elastic structure that includes an elastic body that is deformable in response to an external force and that includes a reflecting portion to reflect light and a transmitting portion to transmit light; and
   a first reflecting mirror that faces the light source to guide the light from the light source to the reflecting portion and the transmitting portion.

2. The tactile and proximity sensor according to claim 1, wherein the first reflecting mirror has a concave shape to collimate or concentrate the light from the light source.

3. The tactile and proximity sensor according to claim 1, further comprising a second reflecting mirror that faces the light receiver to guide light to the light receiver.

4. The tactile and proximity sensor according to claim 1, further comprising:

a substrate between the elastic structure and the first reflecting mirror and including a main surface on a side of the elastic structure and a main surface on a first reflecting mirror side; wherein the light source is provided on the main surface of the substrate on a side of the first reflecting mirror.

5. The tactile and proximity sensor according to claim 4, wherein the light receiver is provided on the main surface of the substrate on the side of the elastic structure.

6. The tactile and proximity sensor according to claim 4, wherein the light receiver is provided on the main surface of the substrate on the side of the first reflecting mirror.

7. The tactile and proximity sensor according to claim 1, wherein the transmitting portion includes a first transmission region, through which the light emitted by the light source and emitted to outside passes, and a second transmission region, through which light incident to the light receiver from outside passes.

8. The tactile and proximity sensor according to claim 1, further comprising:
   a modulation circuit to modulate light to be emitted from the light source; and
   a detection circuit to detect, based on a signal from the light receiver, a result of reception of the light modulated by the modulation circuit.

9. The tactile and proximity sensor according to claim 1, wherein the light source includes a light emitting diode.

10. The tactile and proximity sensor according to claim 1, wherein the light receiver includes a photodiode.

11. The tactile and proximity sensor according to claim 1, wherein the elastic structure includes a plurality of the elastic bodies.

12. The tactile and proximity sensor according to claim 1, wherein the light source includes at least one solid-state light emitting element or at least one semiconductor laser diode.

13. The tactile and proximity sensor according to claim 1, wherein the light receiver includes a position sensitive detector or a CMOS image sensor.

14. The tactile and proximity sensor according to claim 1, wherein the light receiver includes a linear array of light receiving elements or a two-dimensional array of light receiving elements.

15. The tactile and proximity sensor according to claim 8, wherein the light source driving circuit includes a modulator of AM modulation.

16. The tactile and proximity sensor according to claim 8, wherein the detection circuit includes a filter to allow a signal component including a modulation frequency of detection light to pass through or a synchronous detection element.

17. The tactile and proximity sensor according to claim 4, wherein the substrate is made of any of glass, acrylic, polycarbonate, polyimide, silicon, or gallium arsenide.

18. The tactile and proximity sensor according to claim 1, wherein the elastic structure includes a plurality of transparent layer, a reflector, and a shadow mask.

19. The tactile and proximity sensor according to claim 1, further comprising a plurality of the light receivers and a plurality of concave mirrors facing the plurality of light receivers.

20. The tactile and proximity sensor according to claim 1, wherein the elastic structure includes a spring structure.

* * * * *